July 31, 1923.
F. X. LAUTERBUR
MIXING MACHINE
Filed June 4, 1921
1,463,744
3 Sheets-Sheet 1
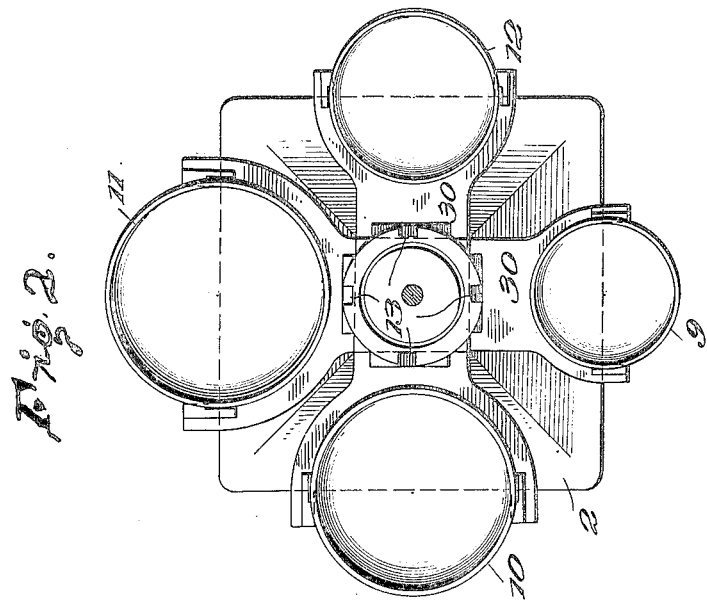
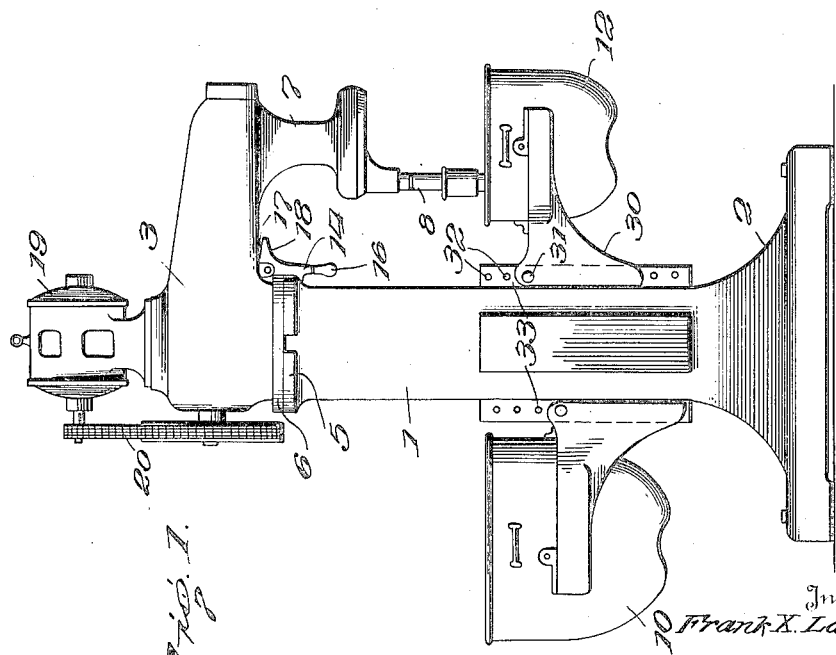
Inventor
Frank X. Lauterbur
By Harry T. Riley
Attorney July 31, 1923.
F. X. LAUTERBUR
MIXING MACHINE
Filed June 4, 1921
1,463,744
3 Sheets—Sheet 2
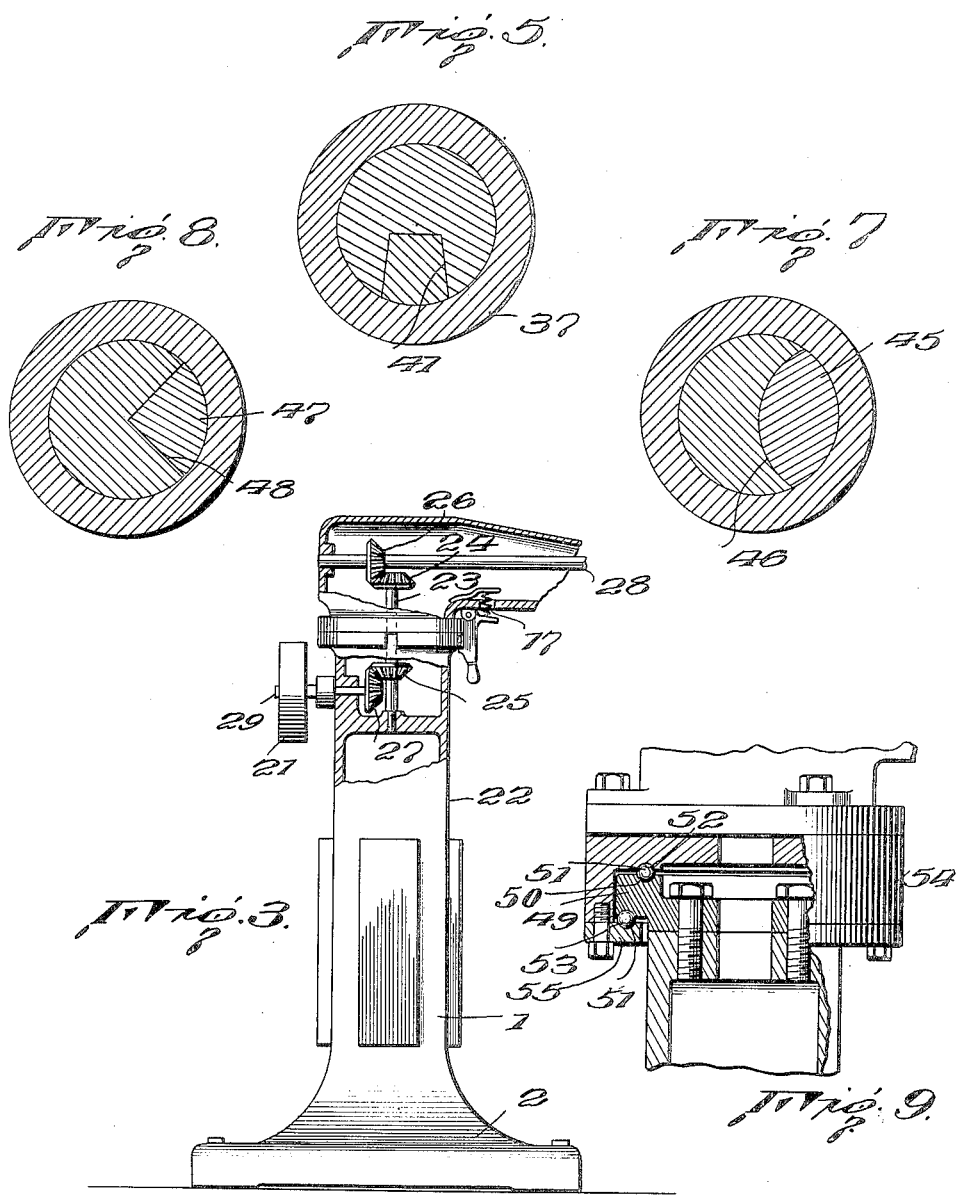
Inventor
Frank X. Lauterbur
By Harry F. Riley
Attorney

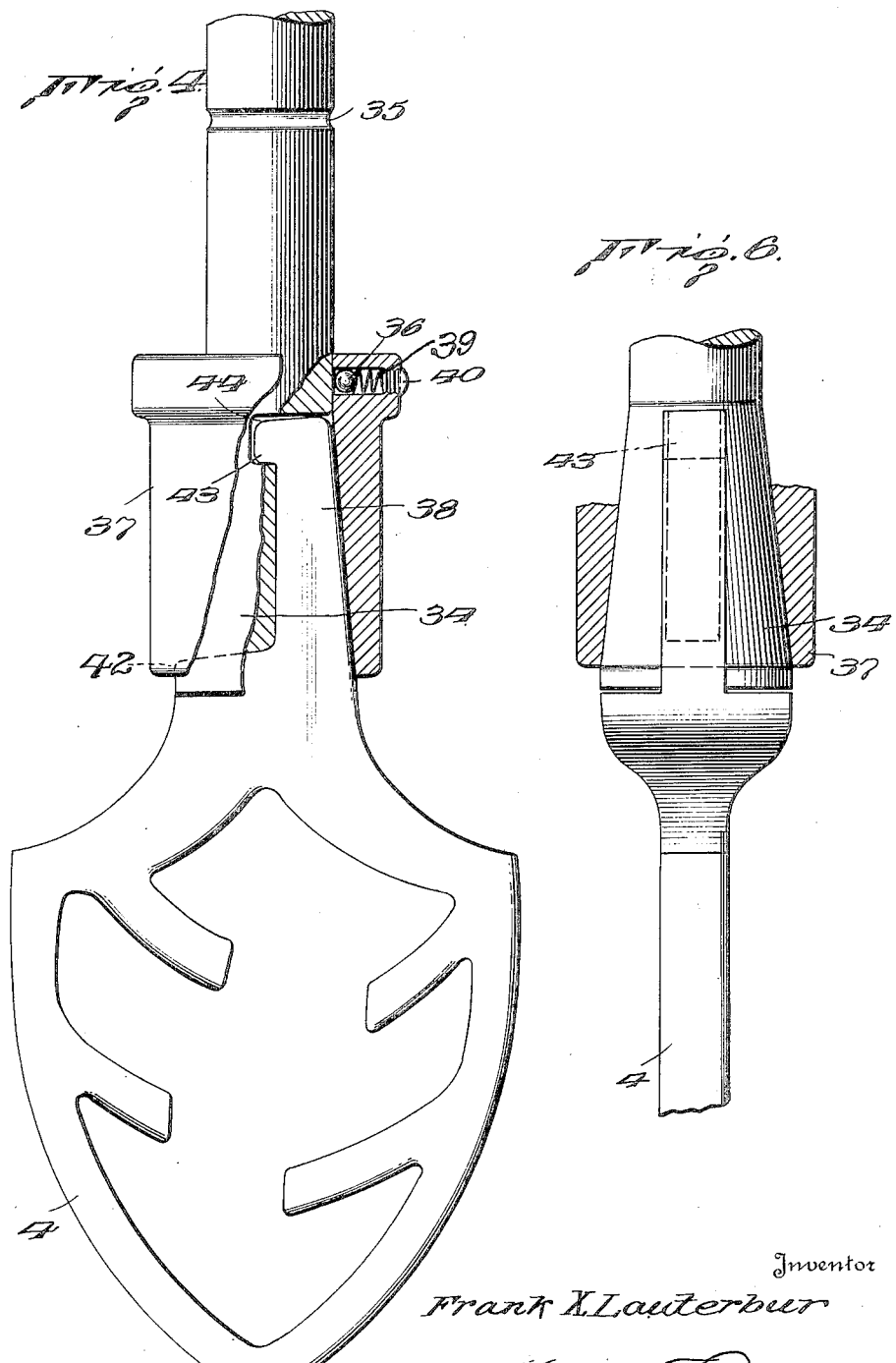

Patented July 31, 1923.

1,463,744

UNITED STATES PATENT OFFICE.

FRANK X. LAUTERBUR, OF SIDNEY, OHIO.

MIXING MACHINE.

Application filed June 4, 1921. Serial No. 475,137.

*To all whom it may concern:*

Be it known that I, FRANK X. LAUTERBUR, a citizen of the United States, residing at Sidney, in the county of Shelby and State of Ohio, have invented new and useful Improvements in Mixing Machines, of which the following is a specification.

The invention relates to a mixing machine.

Heretofore mixing machines for mixing the ingredients of cakes, pastries and the like have been equipped with a single bowl and after the mixing or beating operation has been completed and it is desired to mix another batch in a bowl of a different size, it is necessary to remove the bowl and the beater and substitute another bowl and another beater and then adjust the bowl on the standard or frame to arrange it in proper position with relation to the beater or adjust the head of the machine or the beater with relation to the bowl to arrange the beater in proper position within the same.

It is the object of the present invention to provide a mixing machine equipped with a plurality of bowls and an adjustable head carrying the beater operating mechanism and capable of adjusting to arrange such mechanism and a beater in proper position or alinement with a bowl and after the mixing or beating operation is finished to enable the beater to be readily removed and the head of the machine carrying the beater operating mechanism to be swung out of the way of the operator to afford ready access to the bowl and also to arrange it in proper position or alinement with another bowl whereby a batch of material may be mixed therein while the operator is giving his attention to the bowl in which the batch of material has been mixed and is ready for removal from the bowl.

Another object of the invention is to provide a mixing machine equipped with a plurality of bowls of different sizes and adapted to enable the bowls to be more or less permanently fixed in adjustment so that when the adjustable head of the machine is arranged over any one of the bowls, the proper beater may be applied in position for operation without any adjustment of the bowl, the head of the machine or the beater.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction within the scope of the claims may be resorted to without departing from the spirit or sacrificing any of the advantages of the invention.

In the drawings, in which like numerals of reference designate corresponding parts in the several figures:

Figure 1 is a side elevation of a mixing machine constructed in accordance with this invention.

Figure 2 is a plan view of the same, the head being removed to illustrate the arrangement of the group of bowls more clearly.

Figure 3 is a partial side elevation of a mixing machine illustrating a different arrangement of operating mechanism.

Figure 4 is an enlarged detail view of the beater shaft or spindle illustrating the manner of attachment of the beater.

Figure 5 is a horizontal sectional view of the same.

Figure 6 is a detail elevation of the attaching means partly in section.

Figure 7 is a horizontal sectional view showing another form of shank and recess.

Figure 8 is a similar view showing a sector-shaped shank and recess.

Figure 9 is a detail sectional view, illustrating the manner of swiveling the head.

In the accompanying drawings in which is illustrated the preferred embodiment of the invention, the mixing machine comprises a frame or support consisting of a hollow, vertical column 1 provided at the lower end with an integral, rectangular base 2 and supporting at its upper end a pivoted rotary head 3 constituting a gear case and containing the usual gearing of mixing machines of this type for imparting to a beater 4 an axial rotary movement and also a rotary movement concentric with the bowl or receptacle in which the beater operates and any form of gearing for actuating the beater may be employed and as the specific construction and arrangement of the gearing for operating the beater does not constitute a portion of the present invention, a specific description and illustration of the same is unnecessary. While the frame or support is illustrated in the form of a hollow vertical column 1, yet it may be varied in design and construction as will be readily understood. The hollow column is provided at its upper end with a circular support 5 having an annular flange and receiving a circular bottom portion 6 of the rotary head. The rotary head illustrated in Figure 1 consists of a hollow arm or case having a depending outer portion 7 carrying the dasher or beater shaft or spindle 8 and the beater 4. In this form of the invention, the pivoted rotary head is adapted to be swung around the hollow column to arrange it in proper position or alinement with any one of a group of receptacles 9, 10, 11 and 12 so that after a batch of material is mixed in one receptacle, the head may be swung to another position over another bowl or receptacle. The supporting portion 5 is provided with a plurality of notches 13 formed in its annular flange and adapted to be engaged by a locking lever 14 pivoted at 15 to the said head 3 and provided at its lower end with a handle 16 and maintained in engagement with one of the notches by means of a coiled spring 17 carried by the head and engaging an arm or projection 18 of the locking lever. Various other locking means may, of course, be provided and the gearing in this form of the invention is actuated by an electric motor 19 mounted upon the upper portion of the rotary head 3 directly above the hollow column and connected with the driving shaft of the beater operating mechanism by a belt or sprocket gearing 20. In the form of the invention illustrated in Figure 3 where the beater actuating mechanism is driven from a pulley 21 mounted on the hollow column 22, a central shaft 23 extends through the top of the hollow column and the supporting portion of the adjustable head 3 and is provided with upper and lower bevel gears 24 and 25 meshing with bevel gears 26 and 27 of a horizontal drive shaft 28 and a lower driving shaft 29. The driving shaft 29 which is journaled in suitable bearings on the hollow column, is adapted to be connected by a belt with any suitable motor or engine. The central vertical shaft 23 is adapted to constitute a pivot for the adjustable head or it may pass through a suitable pivot and it will be apparent that any suitable means may be employed for pivoting the adjustable rotary head upon the vertical hollow column or support.

In the accompanying drawings, the bowls are shown of different sizes and are mounted in adjustable brackets 30 secured in their adjustment by pins 31 adapted to pass through suitable perforations 32 in oblong bosses or enlargements 33 formed on the sides of the hollow column, but the group of bowls or receptacles may be mounted in any other desired manner and the adjustable feature may be omitted.

The shaft or spindle 8 which carries the dasher 4, is provided with a tapered lower portion 34 which gradually decreases in diameter upwardly to the cylindrical portion of the shaft or spindle and the latter is provided at a point above and spaced from the tapered lower portion with an annular groove 35 adapted to be engaged by a spring pressed ball 36 for maintaining a sleeve 37 in an elevated position out of engagement with a shank 38 of the beater 4. The sleeve which may be constructed of any suitable material, is interiorly tapered from the bottom to the upper portion, as clearly shown in Figure 4, and is circular in horizontal section, as shown in Figure 5. The ball 36 is arranged in a bore and the spring 39 is retained in position by a screw 40. The beater may be of any of the various forms of beaters or agitators employed in machines of this or similar types and the shank 38 which extends upward from the beater, is tapered cross sectionally, as shown in Figure 5, and fits in a tapering recess 41 in the lower tapered portion of the shaft or spindle. The recess 41 is extended at the bottom at 42 to receive the lower end of the shank 38 and the shank is provided at the upper end with an extension or lug 43 which fits in a corresponding extension 44 of the upper end of the recess. When the sleeve is in an elevated position clear of the recess of the tapered portion of the shaft or spindle, the beater may be removed by a lateral movement of the shaft and it may be readily placed in the recess of the shaft or spindle by a similar movement and when the sleeve is moved downwardly into engagement with the shank and the tapered portion of the shaft or spindle, the beater is firmly and rigidly clamped in engagement with the said shaft or spindle. The form of the shank may be varied and a relatively wide shank 45 having a curved inner face 46 may be employed as illustrated in Figure 7 of the drawings and as shown in Figure 8 the shank 47 and the recess 48 may be sector shaped. These and various other forms will enable the beater to be readily placed in and removed from the recess of the shaft or spindle.

In practice, beaters or agitators corresponding with the several bowls of the group will be provided so that no adjustment vertically will be required and when an operator has finished with one bowl, the pivoted or rotary head may be swung to one side to afford ready access to the bowl. An operator may have one batch or one mixture in one bowl and while it is mixing, prepare a new batch for another bowl and when he is through or partially through with the first batch, say the batch in the larger bowl, he can disconnect the beater and swing the head around and put in the smaller beater in the holding mechanism of the shaft or spindle and start mixing his batch in the smaller bowl. While the machine is mixing the batch in the smaller bowl, the operator may do anything necessary for the other bowl.

The lug which projects laterally from the upper end of the shank and which engages the upper extension of the recess, is adapted to support the beater in position while the sleeve is being adjusted on the shaft or spindle.

The preferred means for swiveling the head or gear case to the column or support is illustrated in Figure 9 of the drawings in which a race casting 49 is bolted to the column and provided with upper and lower ball recesses 50 for the reception of upper and lower antifriction balls 51. The antifriction balls 51 are also arranged in corresponding ball recesses 52 and 53 of a bearing casting 54, and a retaining ring or flange 55 carried by the swiveled head or gear case. This construction provides an antifriction bearing for the swiveled head or gear case and enables the same to be readily mounted on and removed from the column or support.

No claim is made in the present application to the detachable connection for mounting the beater on the shaft or spindle as this forms the subject matter of a copending application filed July 5, 1921.

What is claimed is:—

1. A mixing machine of the class described including a column, a plurality of bowls or receptacles grouped around and supported by the column, an adjustable head also supported by the column and movable around the same for carrying beater operating mechanism to operative position with relation to any one of the bowls or receptacles, and cooperating means on the head and the column for securing the head in position over the bowls or receptacles.

2. A mixing machine of the class described including a column, a plurality of bowls or receptacles grouped around and supported by the column, an adjustable head seated upon and pivoted to the column and movable around the same for carrying beater operating mechanism to operative position over any one of the bowls or receptacles, and cooperating means on the head and the column for securing the head in position over the bowls or receptacles.

3. A mixing machine of the class described including a column, provided at its lower end with a base, a plurality of bowls or receptacles grouped around the column and supported by the same above the base, an adjustable head supported by the column and arranged above the bowls or receptacles and movable around the column for carrying beater operating mechanism to operative position with relation to any one of the bowls or receptacles, and cooperating means on the head and the column for securing the head in position over the bowls or receptacles.

4. A mixing machine of the class described including a column provided at its lower end with a base, an adjustable head supported by the column and movable around the same for carrying beater operating mechanism to different positions, means for detachably securing a plurality of bowls or receptacles to the column between the head and the base at different points around the column, and cooperating means on the column and the head for securing the latter over the bowls or receptacles.

5. A mixing machine including a column having a base and provided with a plurality of bowls grouped around the column and supported by the same above the base, said column being provided at the top with a projecting flange having notches, a head seated upon the column and pivotally connected with the same to permit it to be swung around from one bowl to another, and a locking device carried by the head and arranged to engage the notches of the said flange.

In testimony whereof, I have hereunto affixed my signature.

FRANK X. LAUTERBUR.